United States Patent
Shiao et al.

(10) Patent No.: US 7,075,204 B2
(45) Date of Patent: Jul. 11, 2006

(54) THREADED INNER SLEEVE FOR GENERATOR MAGNET

(75) Inventors: Sam Shiao, Cerritos, CA (US); Robert P. Chen, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 252 days.

(21) Appl. No.: 10/637,373

(22) Filed: Aug. 6, 2003

(65) Prior Publication Data

US 2005/0029885 A1 Feb. 10, 2005

(51) Int. Cl.
*H02K 21/12* (2006.01)

(52) U.S. Cl. .......................... 310/156.22; 310/156.12; 310/156.18; 310/156.28

(58) Field of Classification Search .......... 310/156.28, 310/156.29, 261, 156.08, 154.12, 154.16, 310/154.25, 154.32, 156.01, 156.12, 156.18, 310/156.22

See application file for complete search history.

(56) References Cited

U.S. PATENT DOCUMENTS

| | | | |
|---|---|---|---|
| 2,059,518 A | 11/1936 | Harley | |
| 3,321,650 A * | 5/1967 | Pedone, Jr. et al. | 310/115 |
| 4,433,261 A | 2/1984 | Nashiki et al. | |
| 4,674,178 A | 6/1987 | Patel | |
| 4,893,040 A | 1/1990 | Turner et al. | |
| 5,168,186 A * | 12/1992 | Yashiro | 310/47 |
| 5,448,123 A | 9/1995 | Nilson et al. | |
| 5,563,463 A * | 10/1996 | Stark | 310/156.28 |
| 6,047,461 A * | 4/2000 | Miura et al. | 29/598 |
| 6,437,474 B1 | 8/2002 | Chu | |
| 6,467,150 B1 | 10/2002 | Tanaka | |
| 6,809,451 B1 * | 10/2004 | Brown | 310/156.08 |
| 6,897,587 B1 * | 5/2005 | McMullen et al. | 310/90.5 |
| 2002/0116811 A1 | 8/2002 | Pop, Sr. | |
| 2003/0093893 A1 * | 5/2003 | Jung | 29/596 |
| 2004/0245884 A1 * | 12/2004 | Smith | 310/218 |
| 2005/0099079 A1 * | 5/2005 | McMullen et al. | 310/156.11 |

FOREIGN PATENT DOCUMENTS

JP 06284611 A * 10/1994

* cited by examiner

*Primary Examiner*—Darren Schuberg
*Assistant Examiner*—Erik Preston
(74) *Attorney, Agent, or Firm*—Oral Caglar, Esq.

(57) ABSTRACT

An inner sleeve, having threads on each end, is formed on a motor or generator rotor. A pair of stub shafts are threadably attached to the inner sleeve at each end and a magnet is placed in between. The stub shafts are turned on the inner sleeve to bring them together, thereby creating an axial compressive force on the magnet. By keeping the magnet in a compressive state at all times, cracking of the magnet is prevented, thus keeping the rotor stable during use of the motor or generator. An outer sleeve is shrunk-fit around the magnet and stub shafts to provide a further radial force on the rotor. The magnet assembly of the present invention also enlarges the required radial shrink-fit tolerance of the outer sleeve on the magnet, thereby reducing costs conventionally required to match the outer sleeve to the magnet within close tolerances.

17 Claims, 3 Drawing Sheets

THREADED INNER SLEEVE FOR GENERATOR MAGNET

BACKGROUND OF THE INVENTION

The present invention generally relates a threaded inner sleeve for a magnetized rotor for the motor or generator and, more specifically, to a threaded inner sleeve that may apply an axial compressive force onto the magnet.

Permanent magnet rotors are frequently used in dynamo electric machines such as motors and generators. Permanent magnets are secured to a rotor hub or shaft by any of a variety of means and care must be taken to assure that such securement prevents the magnets from moving either axially or radially. If axial movement is permitted, one or more magnets may not properly align with an armature with the consequence that machine efficiency diminishes. If radial movement occurs, the probability of interfering contact between the rotor and the stator, and the resulting frictional drag and/or damage to machine parts come into existence.

Conventional motor or generator designs may use any shape magnet, so long as a hole is formed in the center of the magnet(s) for insertion of a rotor. As an example, and referring to FIG. 1, arc-shaped magnet sections 10 may be arranged to form a donut shape. A rotor shaft 12 may be inserted in the hole of the donut shape magnet. An outer ring 14, sized slightly smaller than the donut shape of magnet sections 10, is heated to cause its thermal expansion, allowing outer ring 14 to fit around an outside edge 16 of magnet sections 10. Upon cooling, radial shrinkage due to the thermal coefficient of expansion of metal outer ring 14 holds magnet sections 10 frictionally in place.

These conventional motor and generator configuration assembly methods are complex and result in high initial manufacturing costs as well as high operational costs. Manufacturing costs are high due to the need for a close tolerance between outside edge 16 of magnet sections 10 and outer ring 14, requiring machining of both outer ring 14 and magnet sections 10 to exacting standards. Operational costs are high due to possible rotor slippage and/or magnet cracking under operating conditions.

U.S. Pat. No. 4,433,261 concerns a structure for attaching magnets of a rotor for a synchronous motor of a permanent magnet type. Side plates (4) are fixed on a rotor shaft (2). Grooves (4a) are formed in side plates (4). Grooves (4a) match the size of one of the arc-shaped sections of magnet (1). Therefore, one magnet section (1) will fit into groove (4a) and the adjacent magnet section (1) will be offset, fitting into a corresponding groove (4a) of the opposite side wall (4). This configuration forces magnet (1) to move with rotor shaft (2), since side walls (4) are fixed to rotor shaft (2) (FIGS. 3 and 4). This conventional configuration requires the use of magnet segments that are specifically sized to fit into grooves (4a). Should the magnet size or shape change, side plates (4) must be milled to different grooves (4a) to match this size change. Moreover, grooves (4a) must be milled to fairly close size standards to match the size of magnet sections (1).

As can be seen, there is a need for a motor or generator configuration wherein the magnet is contained or fixed in position on the rotor shaft, especially during the machine's worst operating conditions. Such a configuration should be simple in design and relatively low cost in its manufacture.

SUMMARY OF THE INVENTION

In one aspect of the present invention, a permanent magnet machine comprises a rotor; an inner sleeve fitting around a portion of the rotor; a first stub shaft attachable to an inner sleeve first end; a second stub shaft attachable to an inner sleeve second end; a magnet fitting between the first stub shaft and the second stub shaft when the first stub shaft and the second stub shaft are attached to the inner sleeve; and an outer sleeve fitting around the magnet and the first stub sleeve and the second stub sleeve.

In another aspect of the present invention, a permanent magnet machine comprises a rotor; an inner sleeve integrally formed around a portion of the rotor; a first stub shaft attachable to an inner sleeve first end; a second stub shaft attachable to an inner sleeve second end; a magnet fitting between the first stub shaft and the second stub shaft when the first stub shaft and the second stub shaft are attached to the inner sleeve; and an outer sleeve fitting around the magnet and the first stub sleeve and the second stub sleeve.

In yet another aspect of the present invention, a permanent magnet machine comprises a rotor; an inner sleeve fitting around a portion of the rotor; the inner sleeve having an inner sleeve first end and an inner sleeve second end, with both of the inner sleeve first end and the inner sleeve second end having male threads; a first stub shaft threadably attachable to the inner sleeve first end; a second stub shaft threadably attachable to the inner sleeve second end; a magnet fitting between the first stub shaft and the second stub shaft when the first stub shaft and the second stub shaft are threadably attached to the inner sleeve; and an outer sleeve fitting around the magnet and the first stub sleeve and the second stub sleeve.

In a further aspect of the present invention, a magnet assembly for placement on a rotor of a motor or a generator, comprises an inner sleeve fitting around a portion of said rotor; the inner sleeve having an inner sleeve first end and an inner sleeve second end, with both of the inner sleeve first end and the inner sleeve second end having male threads; a first stub shaft threadably attachable to the inner sleeve first end; a second stub shaft threadably attachable to the inner sleeve second end; a magnet fitting between the first stub shaft and the second stub shaft when the first stub shaft and the second stub shaft are threadably attached to the inner sleeve; and an outer sleeve fitting around the magnet and the first stub sleeve and the second stub sleeve.

In still a further aspect of the present invention, a method for making a permanent magnet machine comprises attaching an inner sleeve around at least a portion of a rotor of the permanent magnet machine; attaching a first stub shaft to an inner sleeve first end; attaching a second stub shaft to an inner sleeve second end; fitting a magnet against the inner sleeve between the first stub shaft and the second stub shaft; axially compressing the magnet by moving the first stub shaft toward the second stub shaft, with the magnet there between; and fitting an outer sleeve around the magnet, the first stub shaft and the second stub shaft.

In yet a further aspect of the present invention, a method for making a permanent magnet machine comprises threading an inner sleeve with male threads on an inner sleeve first end and an inner sleeve second end; attaching the inner sleeve around at least a portion of a rotor of the permanent magnet machine; threading a first stub shaft and a second stub shaft with female threads matable with the male threads; threadably attaching a first stub shaft to an inner sleeve first end; threadably attaching a second stub shaft to an inner sleeve second end; fitting a magnet against the inner sleeve between the first stub shaft and the second stub shaft; turning at least one of the first stub shaft and the second stub shaft along the male thread of the inner sleeve to axially compress the magnet by moving the first stub shaft toward the second stub shaft, with the magnet there between; and fitting an outer sleeve around the magnet, the first stub shaft and the second stub shaft.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

Broadly, the present invention provides for an axial constraint on the magnet of a motor or generator to provide additional insurance for the rotor to be fixed inside the magnet. As discussed above, a conventional design may require close tolerance between the outer sleeve and the magnet because thermal shrinking of the outer sleeve frictionally holds the magnet to the rotor. The present invention enlarges the required radial shrink-fit tolerance, thereby reducing time and cost of accurately matching the magnet size with the size of the outer sleeve.

Moreover, the present invention provides a compressive state on the magnet at all times, thereby preventing magnet cracking and the resulting unstable rotor. In contrast, conventional devices employ the radial shrinkage provided by a warmed, slightly undersized metal outer sleeve as it cools to hold the magnet in place. This shrink fit provided by the outer sleeve may not be enough, however, to prevent the magnet from axial and radial motion at the maximum operating conditions, such as ultra high speeds of up to 70,000 rpm and extreme temperature ranges, for example, from about −40 C. to about 200° C.

More specifically, the present invention uses a threaded inner sleeve having ends that axially compress the magnet. As is described in more detail below, this axial compression allows for a lessening of the more exact fit that is required between the magnet and outer sleeve of conventional configurations. Typically in the prior art, the magnet and the outer sleeve are ground to meet very close tolerance requirements. The present invention relaxes these size requirements, resulting in a substantial cost and time benefit in the manufacture of motors and generators.

Figure 1:
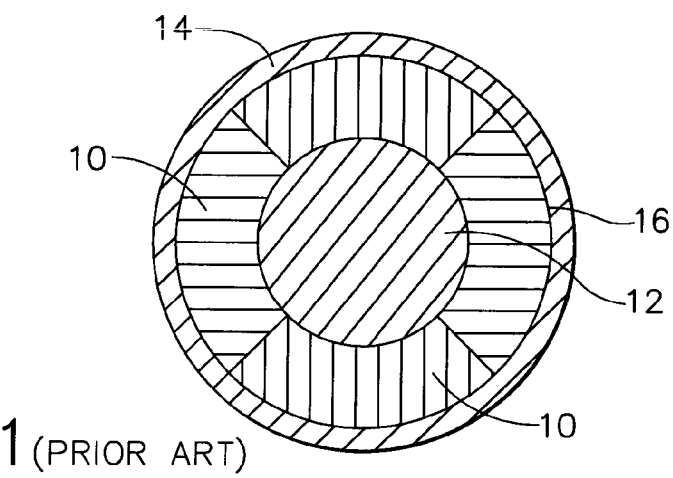
FIG. 1 is a cross-sectional drawing, viewed radially with respect to the rotor, showing a conventional machine having a magnet on a rotor encased by an outer ring.
Figure 2:
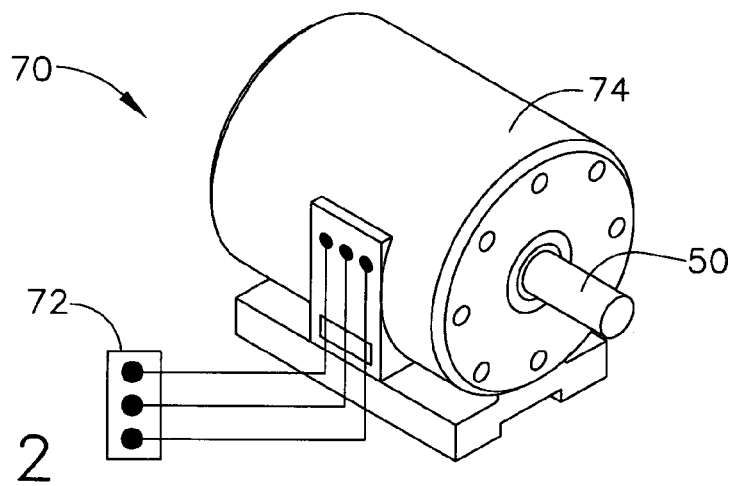
FIG. 2 is a perspective drawing showing a permanent magnet machine which may incorporate a magnet configuration of the present invention.

Referring to FIG. 2, there is shown a perspective drawing of a permanent magnet machine 70 which may incorporate the magnet assembly of the present invention within a housing 74. Generally, permanent magnet machines are those having a permanent magnet mounted on rotor 50. Permanent magnet machines 70 may be used as either a generator, wherein electrical current is supplied out of electrical lines 72 via manually turning rotor 50, or as a motor, wherein electrical current is supplied in through electrical lines 72 to apply torque to rotor 50. The permanent magnet machine 70 of the present invention is especially useful in high-speed applications such as in a high speed generator.

Figure 4:
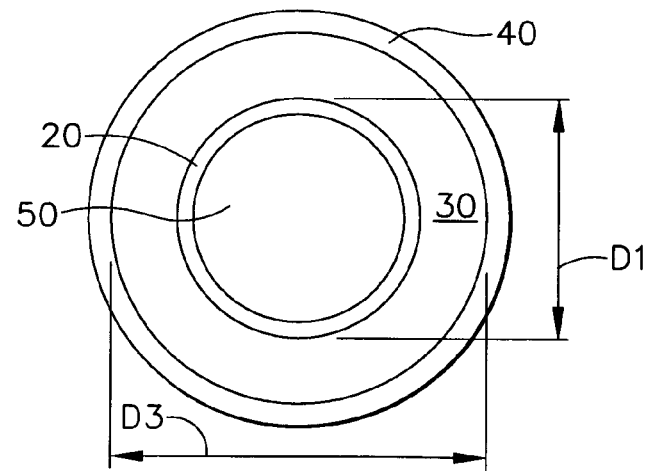
FIG. 4 is a cross-sectional drawing taken along line 4—4 of FIG. 3, showing a radial cross-section with respect to the rotor.
Figure 3:
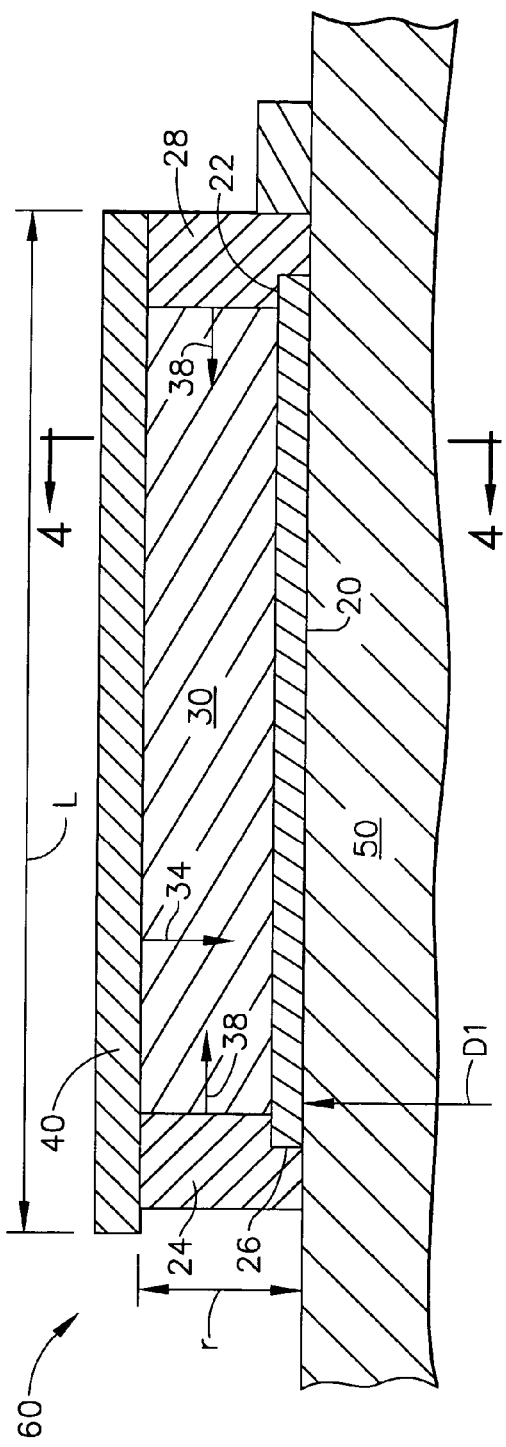
FIG. 3 is a cross-sectional drawing, viewed axially with respect to the rotor, showing a magnet configuration of the present invention.
Figure 5:
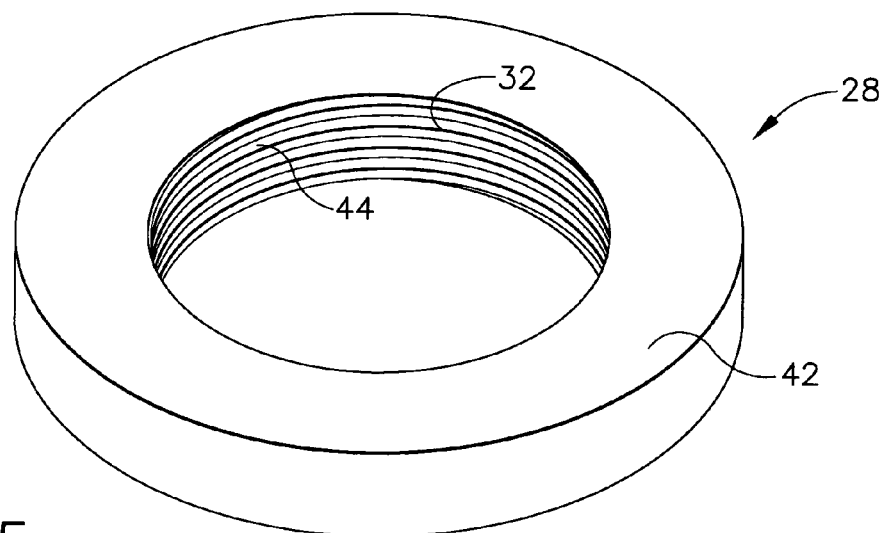
FIG. 5 is a perspective view of a threaded stub shaft according to an embodiment of the present invention.
Figure 6:
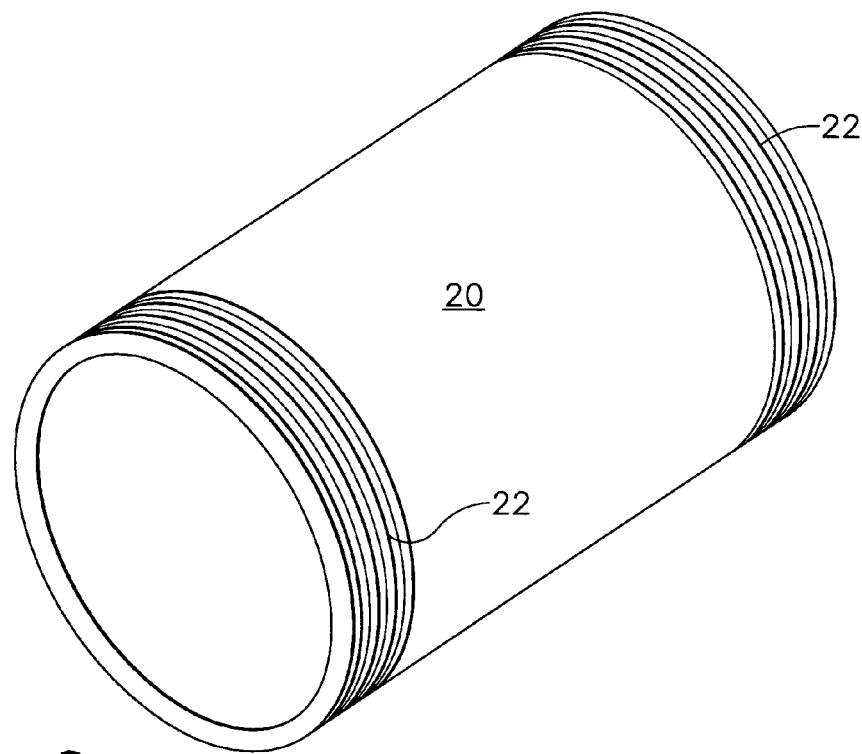
FIG. 6 is a perspective view of a threaded inner sleeve according to an embodiment of the present invention.

Referring to FIGS. 3 through 6, there are shown cross-sectional drawings, viewed axially (FIG. 3) and radially (FIG. 4) with respect to the rotor, showing a magnet assembly 60 (not labeled in FIG. 4) of the present invention. FIGS. 4 and 5 show perspective views of a second stub shaft 28 and an inner sleeve 20, respectively. Inner sleeve 20 may be disposed around at least a portion of rotor 50 to provide for the attachment of a first stub shaft 24 and second stub shaft 28. First stub shaft 24 and second stub shaft 28 are used to axially compress a magnet 30 installed on rotor 50. Preferably, each of first stub shaft and second stub shaft has a flat surface 42 for contact with magnet 30 and an inside surface 44 having female threads 32. Inner sleeve 20 may have male threads 22 on at least one of its ends 26 for attaching at least one of first stub shaft 24 and second stub shaft 28. Preferably, inner sleeve 20 has a male thread 22 on both of its ends 26 for attaching both first stub shaft 24 and second stub shaft 28 on each end 26 of inner sleeve 20. An inside diameter D1 of inner sleeve 20 may be sized to fit a rotor 50 therein. Alternatively, rotor 50 may be machined to form inner sleeve 20 integrally thereon.

Either end 26 of inner sleeve 20 may be attached to first stub shaft 24. At least one of first stub shaft 24 and second stub shaft 28 can have female threads 32 that mate with male threads 22 of inner sleeve 20. Preferably, first stub shaft 24 is attached to inner sleeve 20 with female threads 32 that mate with male threads 22 of inner sleeve 20. The other end 26 of inner sleeve 20 may be attached to second stub shaft 28. Also preferably, second stub shaft 28 is attached to inner sleeve 20 with female threads 32 that mate with male threads 22 of inner sleeve 20.

Figure 7:
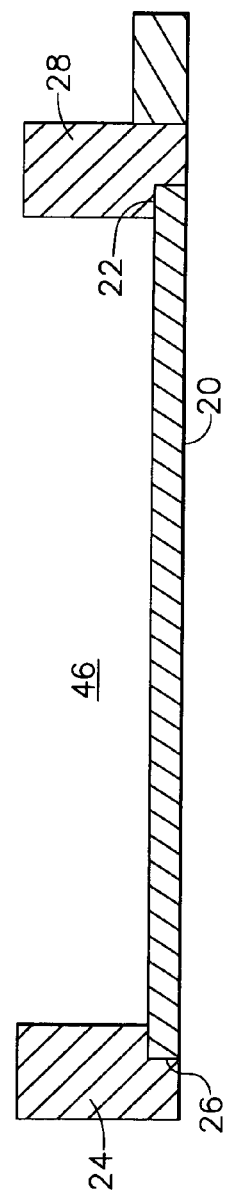
FIG. 7 is a partially assembled axial cross-sectional diagram of the magnet configuration of FIG. 3.

Referring now to FIG. 7, there is shown a cross-sectional view of first stub shaft 24 and second stub shaft 28 assembled with inner sleeve 20. When assembled, first stub shaft 24, second stub shaft 28, and inner sleeve 20 may form a circular channel 46 having a substantially U-shaped cross-section into which a magnet 30 (not shown in FIG. 7) may be inserted.

Referring back to FIGS. 3 through 6, magnet 30 is preferably a one-piece donut-shaped magnet. Magnet 30 may be, however, formed of a plurality of arc-shaped magnet sections, which, when combined, form donut-shaped magnet 30. An inside diameter D2 of magnet 30 may be sized so that rotor 50 and inner sleeve 20 fit therein. First stub shaft 24 and second stub shaft 28 may have a radial thickness r that is equal to or less than the combined radial thicknesses r of magnet 30 and inner shaft 20, thereby allowing an outer sleeve 40 to exert a radial force, in a direction as indicated by arrow 34, on magnet 30 toward rotor 50, as discussed in more detail below. Preferably, radial thickness r is equal to the combined radial thicknesses r of magnet 30 and inner shaft 20.

Outer sleeve 40 advantageously has a length L that can be equal to or greater than the combined lengths of first stub shaft 24, magnet 30 and second stub shaft 28, as shown in FIG. 2. An inside diameter D3 (D1+r) of outer sleeve 40 may be sized equal to or slightly less than the outside diameter of magnet 30. In one embodiment, the inside diameter D3 of outer sleeve 40 is slightly less than the outside diameter of magnet 30. The amount that the inside diameter D3 of outer sleeve 40 is less than the outside diameter of magnet 30 is chosen to allow for a shrink-fit of a warmed, thermally expanded outer sleeve 40 onto magnet 30 as outer sleeve 40 cools. The exact size differential chosen depends on the thermal coefficient of expansions of the material of the outer sleeve 40. In other words, the size differential must be such that, when outer sleeve 40 is warmed, the coefficient of thermal expansion of the material of outer sleeve 40 causes it to expand to an inside diameter D3 greater than or equal to the outer diameter of magnet 30.

First stub shaft 24, second stub shaft 28, outer sleeve 40 and inner sleeve 20 may be formed of any materials suitable for the conditions that may result from the intended use. As an example, first stub shaft 24 and second stub shaft 28 may be formed of a Ni—Cr alloy, such as INCONEL® steel 718, or a regular steel, such as steel 4130 or steel 4330. Outer sleeve 40 and inner sleeve 20 may each be formed of the same materials as first stub shaft 24 and second stub shaft 28. Usefully, outer sleeve 40 can be formed of the Ni—Cr alloy, INCONEL® steel 718, and inner sleeve 20 can be formed of titanium. Titanium is desired over steel or Ni—Cr alloys as inner sleeve 20 due to its lower coefficient of thermal expansion. Thus, during use at a temperature greater than ambient temperatures, such as a temperature from about 25° C. to about 200° C., outer sleeve 40 and magnet 30 may thermally expand more than inner sleeve 20. This differential thermal expansion of outer sleeve 40 and magnet 30 over inner sleeve 20 may thereby create additional compressive force, as indicated by arrow 34, onto rotor 50.

The present invention also provides a method to build magnet assembly 60. One or more donut-shaped magnets 30 can be slid onto inner sleeve 20. A rotor 50 may be fit in inner sleeve 20 or, alternatively, inner sleeve 20 may be preformed integrally with rotor 50.

The inside diameter D2 of magnets 30 can be approximately the same as the outside diameter of inner sleeve 20 so that magnets 30 slide on inner sleeve 20 while contacting inner sleeve 20 along its circumference. The resulting inner sleeve 20/magnet 30 assembly can be threaded into the female threads 32 of first stub shaft 24 and second stub shaft 28. Stub shafts 24 and 28 may be turned along male threads 22 of inner sleeve 20 to induce an axial preload, as indicated by arrows 38, in magnet 30, thereby providing the desired axial constraint for magnet 30.

The resulting inner sleeve 20/magnet 30/stub shafts 24, 28 assembly can be cooled, preferably in dry ice, to thermally shrink the assembly. Outer sleeve 40 can be thermally expanded by warming and slid over the cooled assembly. When the cooled assembly and outer sleeve 40 are removed from their respective heat and cold sources and returned to ambient temperatures, the resulting outer sleeve 40 shrink-fits onto magnet 30 to form magnet assembly 60 of the present invention.

When inner sleeve 20 is formed integrally with rotor 50, further assurances of axial constraint of magnet 30 on rotor 50 are provided. When inner sleeve 20 is fixed by being integrally formed with rotor 50, first stub shaft 24 and second stub shaft 28 are each axially fixed, with respect to rotor 50, when threaded onto inner sleeve 20. When magnet 30 is axially constrained between first stub shaft 24 and second stub shaft 28, magnet is constrained from movement axially along rotor 50. While the present invention has been described using a single donut-shaped magnet 30, for a two-pole motor or generator, a single or multiple magnets 30 may be used depending on the size of the machine, the desired magnetic flux, and other such characteristics.

It should be understood, of course, that the foregoing relates to preferred embodiments of the invention and that modifications may be made without departing from the spirit and scope of the invention.

We claim:

1. A magnet configuration in a permanent magnet machine comprising:
    a rotor;
    an inner sleeve fitting around a portion of said rotor;
    a first stub shaft attachable to an inner sleeve first end;
    a second stub shaft attachable to an inner sleeve second end;
    a magnet fitting between said first stub shaft and said second stub shaft when said first stub shaft and said second stub shaft are attached to said inner sleeve; and
    an outer sleeve shrink-fitted around said magnet and said first stub shaft and said second stub shaft, wherein
    said inner sleeve has male threads on at least one of an inner sleeve first end and an inner sleeve second end; and
    at least one of said first stub shaft and said second stub shaft has female threads mating with said male threads.

2. The magnet configuration according to claim 1, wherein said inner sleeve first end is permanently affixed to said first stub shaft and said inner sleeve second end has male threads mating with said female threads of said second stub shaft.

3. The magnet configuration according to claim 2, wherein said permanent magnet machine is either a motor or a generator.

4. The magnet configuration according to claim 3, wherein said permanent magnet machine is a two-pole generator.

5. The magnet configuration according to claim 1, wherein:
    both said inner sleeve first end and said inner sleeve second end have male threads; and
    both said first stub shaft and said second stub shaft have female threads mating with said male threads.

6. The magnet configuration according to claim 1, wherein said inner sleeve is formed of titanium.

7. The magnet configuration according to claim 6, wherein said first stub shaft, said second stub shaft and said outer sleeve are formed of a Ni—Cr alloy.

8. The magnet configuration according to claim 1, wherein said magnet is a single magnet having a donut shape.

9. The magnet configuration according to claim 1, wherein said inner sleeve is integrally formed with said rotor.

10. A magnet configuration in a permanent magnet machine comprising:
    a rotor;
    an inner sleeve integrally formed around a portion of said rotor;
    a first stub shaft attachable to an inner sleeve first end;
    a second stub shaft attachable to an inner sleeve second end;

a magnet fitting between said first stub shaft and said second stub shaft when said first stub shaft and said second stub shaft are attached to said inner sleeve; and an outer sleeve shrink-fitted around said magnet and said first stub shaft and said second stub shaft, wherein both said inner sleeve first end and said inner sleeve second end have male threads; and both said first stub shaft and said second stub shaft have female threads mating with said male threads.

11. The magnet configuration according to claim 10, wherein:

said inner sleeve is formed of titanium; and said first stub shaft, said second stub shaft and said outer sleeve are formed of a Ni—Cr alloy.

12. The magnet configuration according to claim 11, wherein said permanent magnet machine is a two-pole motor or generator.

13. A permanent magnet generator comprising:

a rotor;

an inner sleeve fitting around a portion of said rotor;

said inner sleeve having an inner sleeve first end and an inner sleeve second end, both of said inner sleeve first end and said inner sleeve second end having male threads;

a first stub shaft threadably attachable to said inner sleeve first end;

a second stub shaft threadably attachable to said inner sleeve second end;

a magnet fitting between said first stub shaft and said second stub shaft when said first stub shaft and said second stub shaft are threadably attached to said inner sleeve;

an outer sleeve fitting around said magnet and said first stub shaft and said second stub shaft; and a set of electrical lines carrying electric current generated from said permanent magnet generator.

14. The permanent magnet generator according to claim 13, wherein said inner sleeve is integrally formed with said rotor.

15. The permanent magnet generator according to claim 14, wherein:

said inner sleeve is formed of titanium; and said first stub shaft, said second stub shaft and said outer sleeve are formed of a Ni—Cr alloy.

16. A magnet assembly for placement on a rotor of a motor or a generator, comprising:

an inner sleeve fitting around a portion of said rotor;

said inner sleeve having an inner sleeve first end and an inner sleeve second end, both of said inner sleeve first end and said inner sleeve second end having male threads;

a first stub shaft threadably attachable to said inner sleeve first end;

a second stub shaft threadably attachable to said inner sleeve second end;

a magnet fitting between said first stub shaft and said second stub shaft when said first stub shaft and said second stub shaft are threadably attached to said inner sleeve; and an outer sleeve fitting around said magnet and said first stub shaft and said second stub shaft.

17. The permanent magnet machine according to claim 16, wherein said inner sleeve is integrally formed with said rotor.

\* \* \* \* \*